(12) United States Patent
Fujii et al.

(10) Patent No.: US 7,639,607 B2
(45) Date of Patent: Dec. 29, 2009

(54) SIGNALING SYSTEM FOR SIMULTANEOUSLY AND AUTONOMOUSLY SETTING A SPARE PATH

(75) Inventors: Yasuki Fujii, Kawasaki (JP); Keiji Miyazaki, Kawasaki (JP); Shinya Kanou, Kawasaki (JP); Akira Nagata, Kawasaki (JP); Takuya Okamoto, Kawasaki (JP); Tomoyuki Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 553 days.

(21) Appl. No.: 11/259,014

(22) Filed: Oct. 26, 2005

(65) Prior Publication Data

US 2007/0019541 A1 Jan. 25, 2007

(30) Foreign Application Priority Data

Jul. 20, 2005 (JP) .............................. 2005-209961

(51) Int. Cl.
*H04J 1/00* (2006.01)
(52) U.S. Cl. ....................................... 370/228; 370/258
(58) Field of Classification Search ......... 370/216–228, 370/238, 254–258, 401
See application file for complete search history.

(56) References Cited

U.S. PATENT DOCUMENTS

| 6,530,032 | B1* | 3/2003 | Shew et al. ................. 370/222 |
| 6,532,088 | B1* | 3/2003 | Dantu et al. ................ 370/223 |
| 6,731,597 | B1* | 5/2004 | Batchellor et al. .......... 370/223 |
| 2002/0024931 | A1* | 2/2002 | Chikazawa et al. ......... 370/228 |
| 2003/0118024 | A1* | 6/2003 | Lee et al. .................... 370/238 |

OTHER PUBLICATIONS

Louis Berger, GMPLS Based Segment Recovery, Oct. 2004, pp. 1-9.*

* cited by examiner

*Primary Examiner*—Ricky Ngo
*Assistant Examiner*—Pao Sinkantarakorn
(74) *Attorney, Agent, or Firm*—Katten Muchin Rosenman LLP

(57) ABSTRACT

A signaling system able to improve the efficiency of utilization of network resources and autonomously set a correct spare route, that is, a signaling system setting a path passing through two rings interconnected by a plurality of nodes by signaling wherein each node is provided with an inter-node connection information table including topology information in the network and a branch node judgment unit for judging whether a home node is a branch node based on the content of the inter-node connection information table and wherein when the home node receives a signaling message for setting a working path and it is judged that the node is a branch node, the signaling of the spare path is started for the destination node of the spare path based on the information in the inter-node connection information table so as to autonomous set the spare path.

13 Claims, 10 Drawing Sheets

Fig.3

HOME RING CONFIGURATION INFORMATION

| NODE ADDRESS |
| --- |
| 11-12-13-14-15 |

Fig.4

INTER-RING CONNECTION INFORMATION

| RING NO. | CONNECTION INFORMATION |
| --- | --- |
| RING 2 | 12-22, 13-23 |
| RING 3 | 14-33, 15-32 |
| ... | ... |

Fig.5

ADJOINING RING CONFIGURATION INFORMATION

| RING NO. | CONFIGURATION INFORMATION |
| --- | --- |
| RING 2 | 21-22-23-24-25 |
| RING 3 | 31-32-33-34-35 |
| ... | ... |

Fig.6

NODE A

| ADD NODE | DROP NODE | BRANCH |
|----------|-----------|--------|
| A | B | NO |
| A | C | YES |
|  |  |  |

NODE B

| ADD NODE | DROP NODE | BRANCH |
|----------|-----------|--------|
| A | B | NO |
| D | B | YES |
|  |  |  |

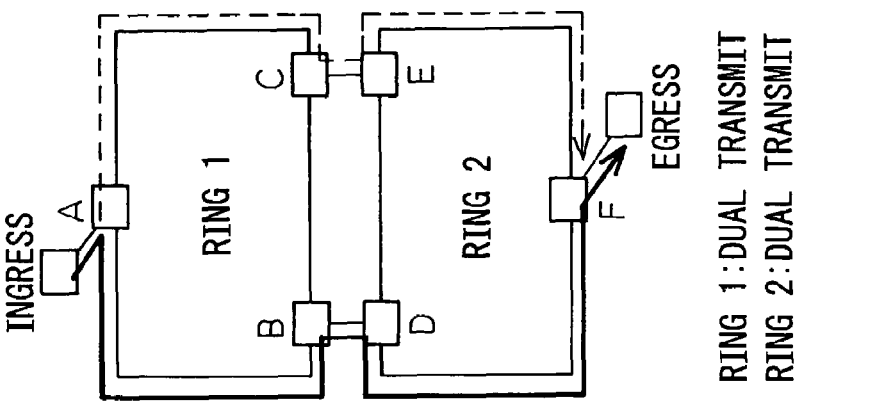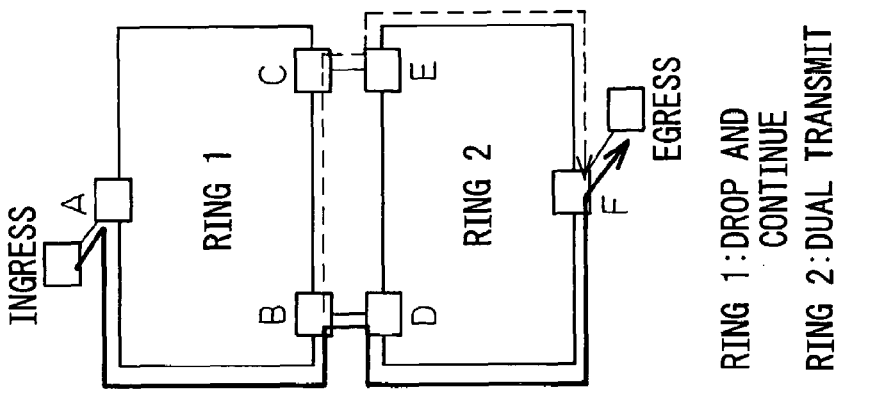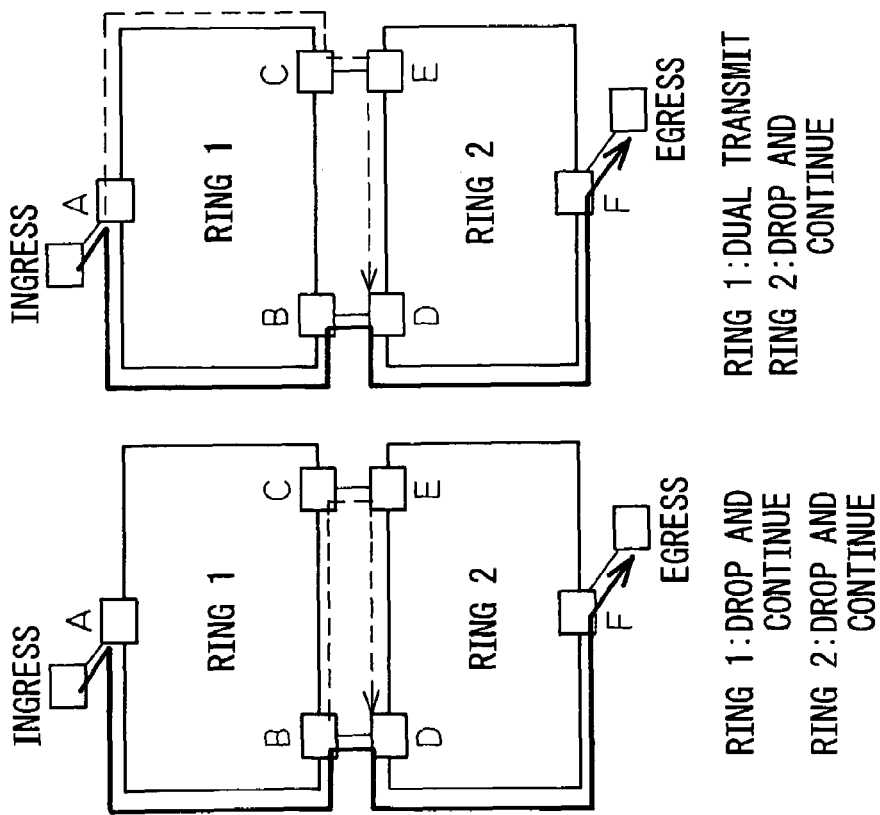

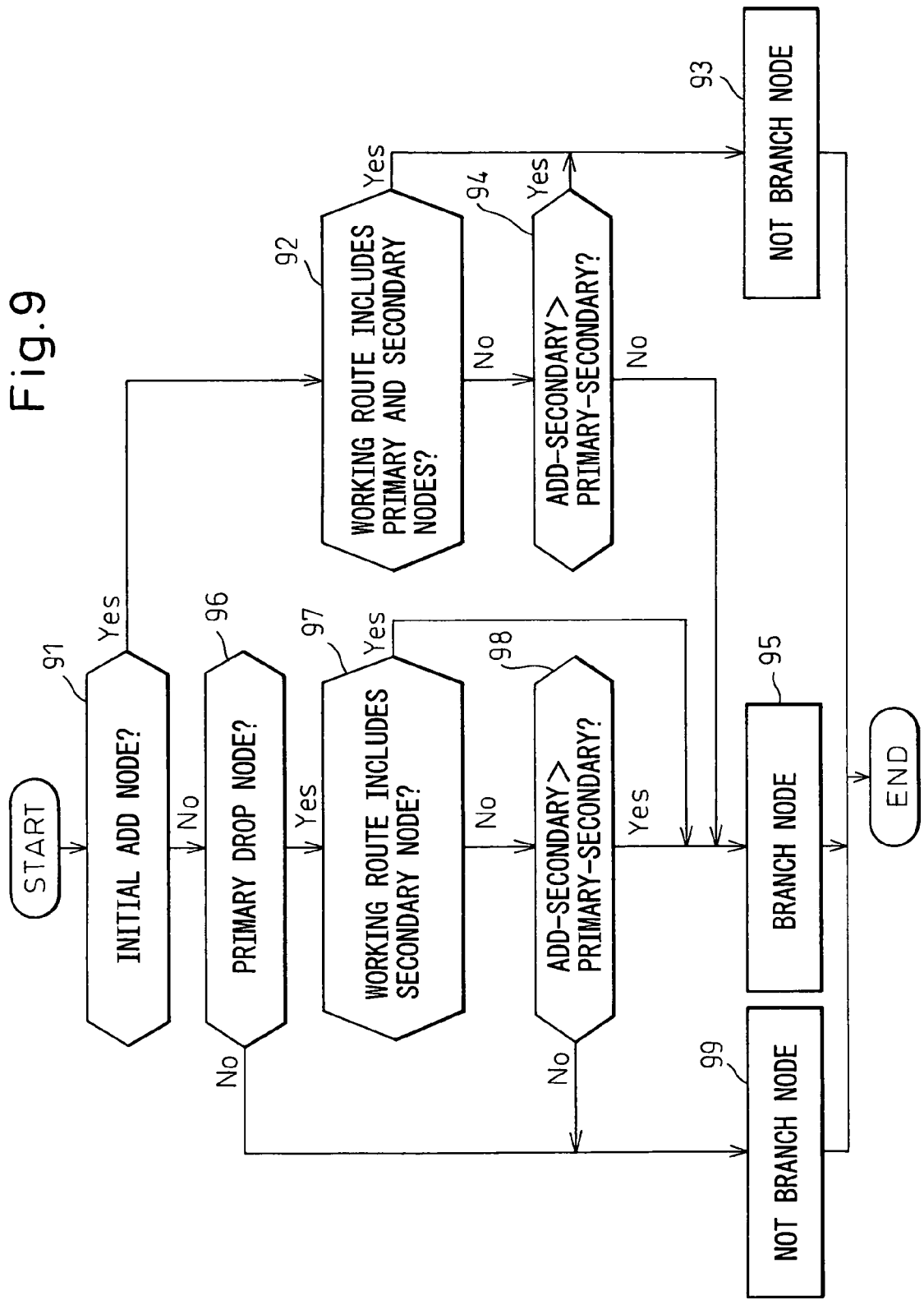

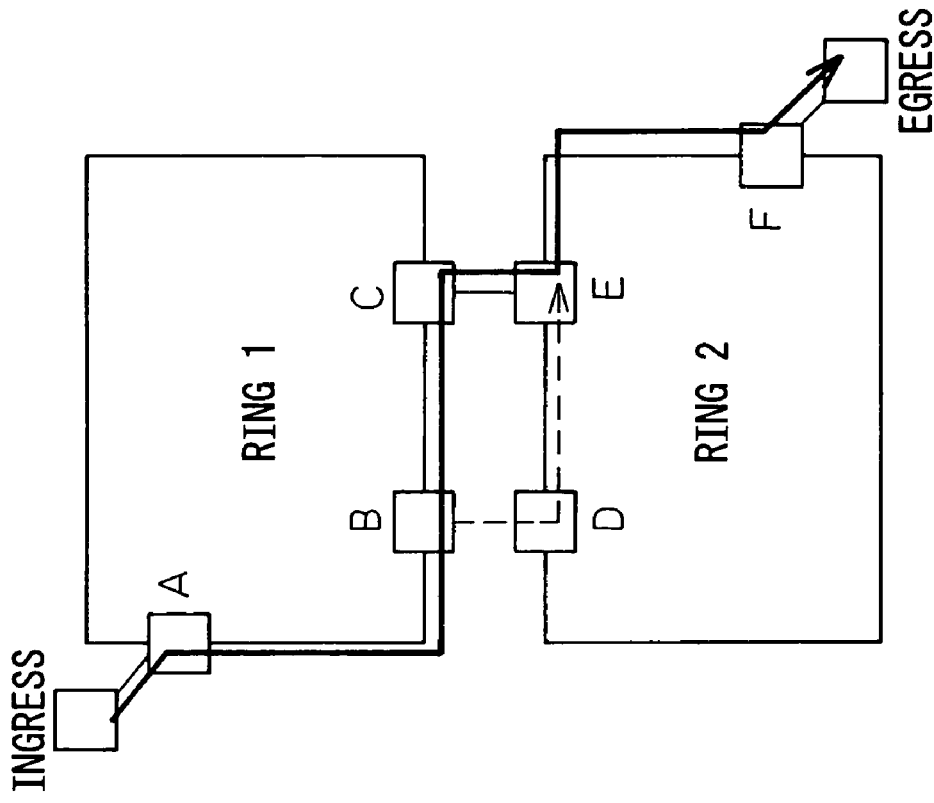
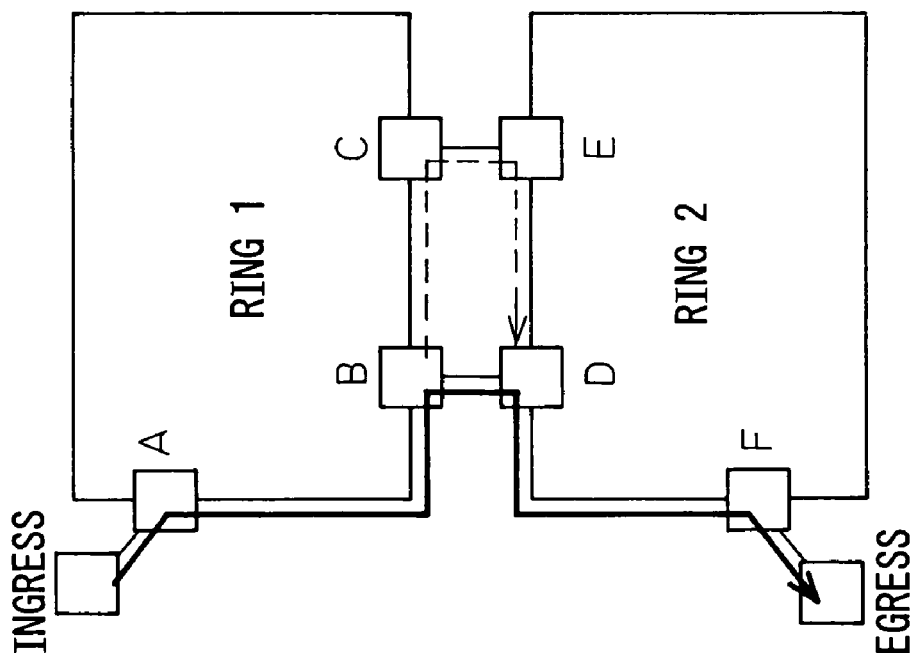
Fig.10A
Fig.10B

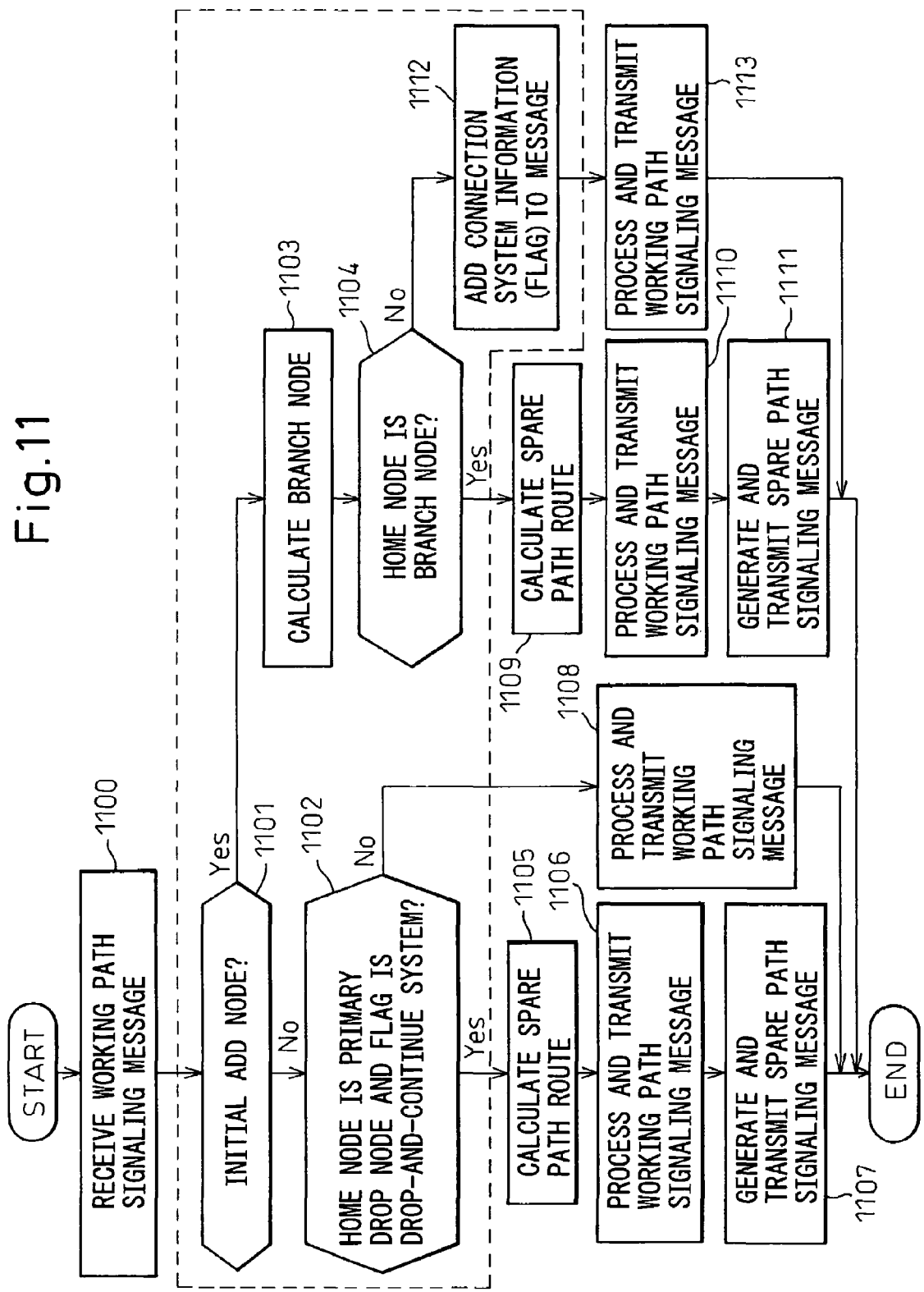

SIGNALING SYSTEM FOR SIMULTANEOUSLY AND AUTONOMOUSLY SETTING A SPARE PATH

CROSS-REFERENCE TO RELATED APPLICATIONS

This application is based upon and claims a priority of Japanese Patent Application No. 2005-209961, filed Jul. 20, 2005, the contents being incorporated herein by reference.

BACKGROUND OF THE INVENTION

1. Field of the Invention

The present invention relates to a signaling system for simultaneously autonomously setting a spare path when setting a working path passing through rings by signaling in a network including a plurality of rings connected to each other at a plurality of nodes.

2. Description of the Related Art

In a SONET/SDH network, as technology for setting paths by signaling, for example, there is the RSVP-TE expansion of the GMPLS (RFC3473). As technology for further expanding the RSVP-TE and simultaneously and autonomously setting the spare paths of the rings as well, there are the following:

(a) "Labeling system" (Japanese Patent Application No. 2005-102092 filed on Mar. 31, 2005)

(b) "Dynamic control system of segment recovery" (draft-ietf-ccamp-gmpls-segment-recovery-01.txt)

The system of (a) is a system having pair information of nodes connecting rings among the nodes present in each ring and setting spare paths by the drop-and-continue system. The system of (b) is a system calculating the route of a spare path and starting the signaling of the spare path when judging that the home node is a branch.

This related art is for example disclosed in Japanese Patent Publication (A) No. 2003-23436, Japanese Patent Publication (A) No. 2003-101558, and Japanese Patent Publication (A) No. 2000-236347.

The labeling system of the system of (a) of the related art cannot be used to handle the dual transmit system. It can only be used to handle the drop-and-continue system. Therefore, even when the dual transmit system is better in efficiency of utilization of the spare path network resources depending on the network configuration or route of the working path, the spare path has to be set by the drop-and-continue system. There was therefore the disadvantage of an extremely poor efficiency of utilization of the spare path network resources. Note that the dual transmit system is the system where the working path is branched into a working path and spare path at the first node (ADD node) which it enters, while the drop-and-continue system is the system where the working path is branched into a working path and spare path at the node dropping from one ring to an adjoining ring.

In the segment recovery dynamic control system of the system of (b) of the related art, basically a mesh network is covered and a ring is not considered, so at which node the rings are connected is not clear. There was therefore the disadvantage that a spare route for correct operation could not be set.

SUMMARY OF THE INVENTION

An object of the present invention is to provide a signaling system able to improve the efficiency of utilization of the network resources and autonomously set the correct spare route when setting a working path passing through rings by signaling in a network including a plurality of rings connected at a plurality of nodes.

To achieve the above object, according to a first aspect of the present invention, there is provided a signaling system setting a path passing through two rings interconnected by a plurality of nodes forming a network by signaling, wherein each of the nodes is provided with an inter-node connection information table including topology information indicating how the nodes in the network are connected and a branch node judgment unit judging whether that home node becomes a branch node based on content of the inter-node connection information table, and when that home node receives a signaling message for setting a working path and the branch node judgment unit judges that that node is a branch node, the spare path signaling is started for the destination node of the spare path based on the information in the inter-node connection information table so as to autonomously set a spare path. According to this, since the signaling of the spare path is started for the destination node of the spare path based on the information in the inter-node connection information table, when setting the working path passing through rings by signaling in a network including a plurality of rings interconnected by a plurality of nodes, it becomes possible to improve the efficiency of utilization of the network resources and autonomously set the correct spare route.

Preferably the path passing through the two rings is a path terminated at a destination ring, the inter-node connection information table is provided with a home ring configuration information table including home ring topology indicating how the nodes in the home ring to which the home node belongs are connected and an inter-ring connection information table including inter-ring connection information indicating how the home ring is connected to the nodes in a ring adjoining the home ring, and the branch node judgment unit sets the spare path based on the content of the home ring configuration information table and the inter-ring connection information table. According to this, when the path is terminated at the destination ring, the inter-node connection information table need only be comprised of a home ring configuration information table and inter-ring connection information table.

Preferably the path passing through the two rings is a path not terminated at a destination ring, the inter-node connection information table is provided with a home ring configuration information table including home ring topology indicating how the nodes in the home ring to which the home node belongs are connected, an inter-ring connection information table including inter-ring connection information indicating how the home ring is connected to the nodes in a ring adjoining the home ring, and an adjoining ring configuration information table including adjoining ring topology information indicating how the nodes in the ring adjoining the home ring are connected, and the branch node judgment unit sets the spare path based on the content of the home ring configuration information table, the inter-ring connection information table, and the adjoining ring configuration information table. According to this, when the path is not terminated at the destination ring, the inter-node connection information table can improve the efficiency of utilization of network resources and autonomously set the correct spare route based on the home ring configuration information table, the inter-ring connection information table, and the adjoining ring configuration information table.

Preferably each of the nodes is further provided with a spare path route calculation unit calculating a route from a branch node to a spare path terminating node, and when receiving a signaling message for setting a working path and the branch node judgment unit judges the node is a branch node, the spare path route calculation unit calculates a cost of the route of the spare path and starts the signaling for the most inexpensive spare path so as to autonomously set the spare path. According to this, since the route calculation unit detects the most inexpensive spare path, it is possible to improve the efficiency of utilization of network resources.

Preferably the rings are bi-directional line switched rings (BLSR), and the branch node judgment unit selects one of a drop-and-continue system and dual transmit system based on a policy or the results of comparison of at least one of the number of hops, distance, number of unused channels, and cost between a start node or ADD node of the home ring and a secondary node constituted by a node not on the route of the working path or a node far from the start node on the route of the working path among the nodes present in the home ring and connected to nodes of the ring adjoining the home ring and forming pairs with them and between a primary node constituted by a node not the secondary node among the nodes connected to the nodes of the ring adjoining the home ring and forming pairs with them and a secondary node. According to this, since either of the drop-and-continue system and the dual transmit system is selected based on one of a policy and the result of at least one comparison of the number of hops, distance, number of unused channels, and cost between the primary node and secondary node, it is possible to improve the efficiency of utilization of network resources.

Preferably when the working path passes through both of the primary node and second node of the home ring, the drop-and-continue system is selected. According to this, when the fact that the working path passes through both of the primary node and secondary node is known in advance, the drop-and-connect system may be selected as the system for setting the spare path so as set the reliably correct spare path.

Preferably the spare path route calculation unit determines the route of the spare path by calculating the shortest route using as candidates of the end point of the spare path the nodes included on the path of the working path in the interconnection nodes of the destination ring and drop nodes or terminating node of the destination ring. According to this, since candidates of the spare path are used for calculating the shortest route, the efficiency of utilization of network resources can be improved more reliably.

Preferably the rings are bi-directional line switched rings (BLSR), and the branch node judgment unit selects one of a drop-and-continue system and dual transmit system based on a policy or the results of comparison of at least one of the number of hops, distance, number of unused channels, and cost between a drop node or terminating node of the destination ring and a secondary node constituted by a node not on the route of the working path or a node far from the terminating node on the route of the working path among the nodes present in the destination ring and connected to nodes of the home ring and forming pairs with them and between a primary node constituted by a node not the secondary node among the nodes present in the destination ring, connected to the nodes of the home ring, and forming pairs with them and a secondary node. According to this, when the rings are BLSRs, since either of the drop-and-continue system and the dual transmit system can be selected based on one of a policy and the result of at least one comparison of the number of hops, distance, number of unused channels, and cost between the drop node or terminating node of the destination ring and the secondary node of the destination ring and between the primary node of the destination ring and secondary node of the destination ring, it is possible to improve the efficiency of utilization of network resources.

Preferably the rings are bi-directional line switched rings (BLSR) and, when the branch node judgment unit judges that for example the node is the branch node, the data arriving at the node is transferred to the node adjoining the home node by one of the drop-and-continue system and dual transmit system in accordance with the content of the inter-node connection information table. According to this, the system is realized more reliably when the rings are BLSRs.

According to a second aspect of the invention, there is provided a signaling method setting a path passing through two rings interconnected by a plurality of nodes forming a network by signaling, comprising providing each of the nodes with an inter-node connection information table including topology information indicating how the nodes in the network are connected and a branch node judgment unit judging whether that home node becomes a branch node based on content of the inter-node connection information table and, when that home node receives a signaling message for setting a working path and the branch node judgment unit judges that that node is a branch node, starting the spare path signaling for the destination node of the spare path based on the information in the inter-node connection information table so as to autonomously set a spare path. According to this, since the signaling of the spare path is started for the destination node of the spare path based on the information in the inter-node connection information table, when setting the working path passing through rings by signaling in a network including a plurality of rings interconnected by a plurality of nodes, it becomes possible to improve the efficiency of utilization of the network resources and autonomously set the correct spare route.

BRIEF DESCRIPTION OF THE DRAWINGS

These and other objects and features of the present invention will become clearer from the following description of the preferred embodiments given with reference to the attached drawings, wherein:

FIG. 3 is a view of a home ring forming table 2 in a ring 1 in the network shown in FIG. 2;

FIG. 4 is a view of the content of an inter-ring connection information table 3 in FIG. 2;

FIG. 5 is a view of the content of an adjoining ring forming information table 4 in the network shown in FIG. 2;

FIG. 6 is a view of an example of a branch node judgment table employed in Example 10;

FIGS. 7A to 7D are views for explaining in brief a signaling operation in a network according to different embodiments;

FIG. 9 is a flow chart explaining an example of the operation in a branch node judgment unit 6;

FIGS. 10A and 10B are views of examples of the configuration of a ring;

FIG. 11 is a flow chart for explaining one operation of a node according to Example 13.

DESCRIPTION OF THE PREFERRED EMBODIMENTS

Figure 1:
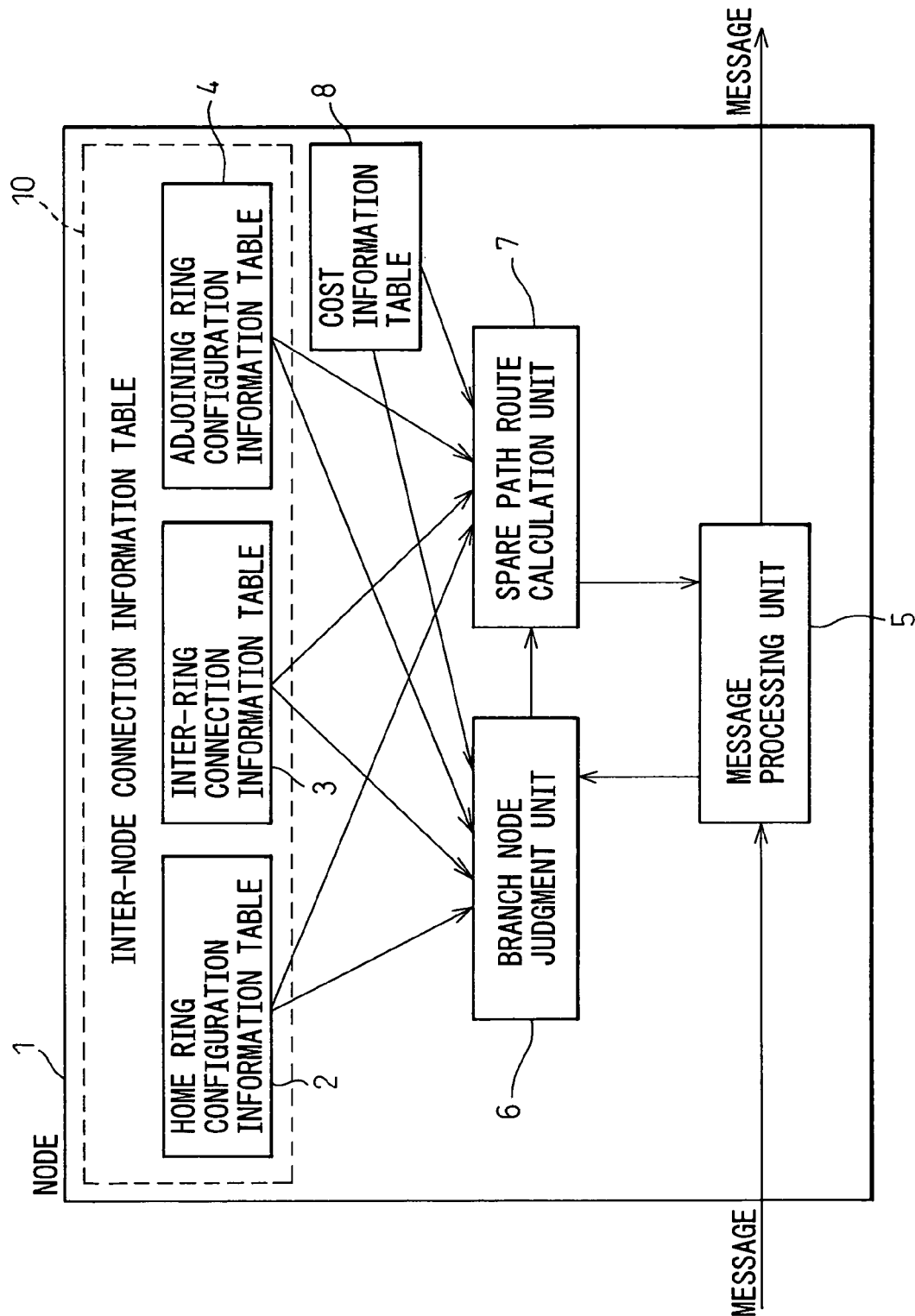
FIG. 1 is a block diagram of the configuration of a node forming part of a signaling system according to the present invention.

Below, embodiments of the present invention will be explained in detail with reference to the drawings. FIG. 1 is a block diagram of the configuration of a node forming part of the signaling system according to the present invention. In the figure, 1 is one of a plurality of nodes forming a network. There are a plurality of nodes 1 in each ring. The plurality of nodes in each ring connect two rings. The signaling system according to the present invention sets the path passing through the two rings by signaling.

Figure 2:
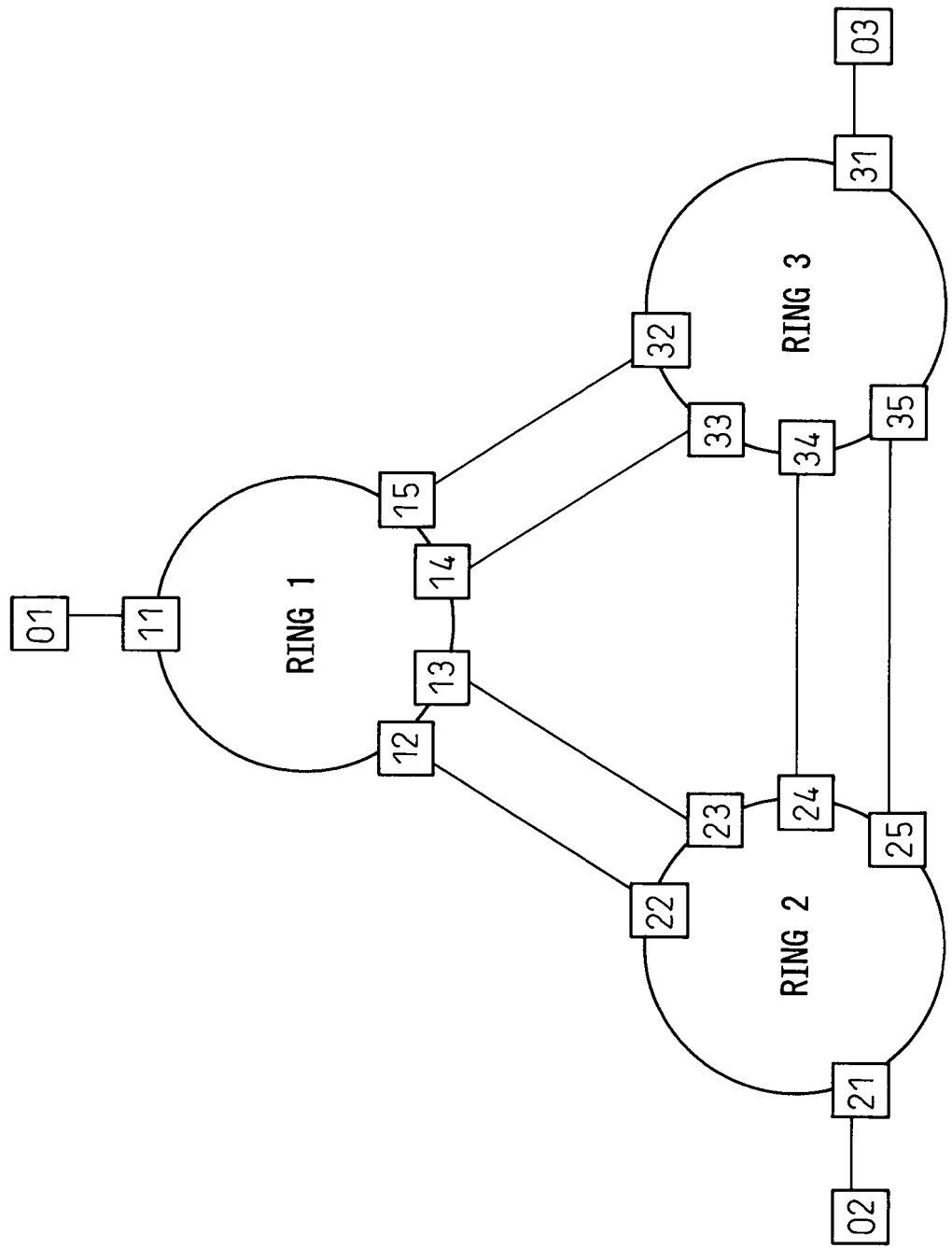
FIG. 2 is a view of an example of a network forming part of a signaling system according to the present invention.

FIG. 2 is a view of an example of a network forming part of the signaling system according to the present invention. In the figure, a ring 1 includes nodes 11, 12, 13, 14, and 15, a ring 2 includes nodes 21, 22, 23, 24, and 25, and a ring 3 includes nodes 31, 32, 33, 34, and 35. The node 11 in the ring 1 is connected to an external node 01, the node 21 of the ring 2 is connected to an external node 02, and the node 31 in the ring 3 is connected to an external node 03. The pair of the nodes 12 and 13 in the ring 1 is connected to the pair of nodes 22 and 23 in the ring 2. The pair of the nodes 14 and 15 in the ring 1 is connected to the ring 33 and 32 in the ring 3. The pair of the nodes 24 and 25 in the ring 2 is connected to the pair of the nodes 34 and 35 in the ring 3.

EXAMPLE 1

In this example, the node 1 is provided with an inter-node connection information table 10 including topology information showing how the nodes in the network are connected and a branch node judgment unit 6 for judging whether the home node is a branch node based on the content of the inter-node connection information table 10. Further, when receiving a signaling message for setting the working path and when it is judged by the branch node judgment unit 6 that the node is a branch node, the spare path is autonomously set by starting signaling of the spare path for the destination node of the spare path based on the information in the inter-node connection information table 10.

EXAMPLE 2

In this example, the path passing through two rings is a path terminated by the destination ring. In this case, the inter-node connection information table 10 is provided with a home ring configuration information table 2 including home ring topology information showing how the nodes in the home ring to which the home node belongs are connected and an inter-ring connection information table 3 including inter-ring connection information showing how the home ring is connected to the nodes in the ring adjoining the home ring.

In Example 2, the branch node judgment unit 6 sets a spare path based on the contents of the home ring configuration information table 2 and the inter-ring connection information table 3.

FIG. 3 is a view of the content of the home ring configuration table 2 in the ring 1 in the network shown in FIG. 2. As shown in the figure, in the ring 1, the nodes 11, 12, 13, 14, and 15 are connected in that order.

FIG. 4 is a view of the content of the inter-ring connection information table 3 in FIG. 2. As shown in the figure, the connection information between the ring 1 and the ring 2 are 12-22 and 13-23. Further, the connection information between the ring 1 and the ring 3 are 14-33 and 15-32.

EXAMPLE 3

In this example, the path passing through the two rings is a path terminated at the destination ring. In this case, the inter-node connection information table 10 is provided with the home ring configuration information table 2 and inter-ring connection information table 3 and an adjoining ring configuration information table 4 including adjoining ring topology information showing how the nodes in the ring adjoining the home ring are connected (FIG. 1).

FIG. 5 is a view of the content of the adjoining ring configuration information table 4 in the network shown in FIG. 2. As shown in the figure, the configuration information of the ring 2 adjoining the ring 1 is 21-22-23-24-25 and shows the order in which the nodes are connected to. In the same way, the configuration information of the ring 3 adjoining the ring 1 is 31-32-33-34-35 and shows the order in which the nodes are connected.

In Example 3, the branch node judgment unit 6 sets the spare path based on the content of the home ring configuration information table 2, the inter-ring connection information table 3, and the adjoining ring configuration information table 4. The contents of the home ring configuration information table 2, the inter-ring connection information table 3, and the adjoining ring configuration information table 4 in Examples 2 and 3 are manually input, are given from the network management system (NMS), element management system (EMS), or other center, or are given to the tables by the method of advertisement by some sort of protocol.

EXAMPLE 4

In Example 4, each of the nodes is further provided with a spare path route calculation unit 7 for calculating the route from the branch node to the spare path terminating node. When receiving a signaling segment for setting the working path, when the branch node judgment unit 6 judges that the node is the branch node, the received message and the information from the tables 2, 3, and 4 are used by the spare path route calculation unit 7 to calculate the cost of the route of the spare path. By starting the signaling for the cheapest spare path, the spare path is autonomously set.

In Examples 1 to 4, a message processing unit 5 is provided at each node and processes the received message to a transmitted message. In particular, in Example 4, the spare path message including the route information of the spare path calculated by the route calculation unit 7 is sent from the message processing unit 5.

EXAMPLE 5

According to Example 5, the branch node judgment unit 6 selects one of the drop-and-continue system and dual transmit system based on a policy or the results of comparison of at least one of the number of hops, distance, number of unused channels, and cost between the start node and ADD node of the home ring and a secondary node constituted by a node not on the route of the working path or a node far from the start node on the route of the working path among the nodes present in the home ring and connected to nodes of the ring adjoining the home ring and forming pairs with them and between a primary node constituted by a node not the secondary node among the nodes connected to the nodes of the ring adjoining the home ring and forming pairs with them and a secondary node.

Specifically, in FIG. 2, assume that the start node is 11 and a working path passing through 11-12-22-21-02 is set. The "nodes connected with nodes of a ring adjoining the home ring and forming pairs with them" means the nodes 12 and 13 connected to the nodes 22 and 23 of the ring 2 adjoining the ring 1. In this case, the "primary node in the ring 1" is the node 12 and the secondary node is the node 13. Therefore, the branch node judgment unit 6 calculates the number of hops, distance, number of unused channels, and cost between the start node 11 and the secondary node 13 through the node 15 and node 14 through which the working path does not pass, calculates the number of hops, distance, number of unused channels, and cost between the primary node 12 and the secondary node 13, compares the calculated values, and selects the route with a small number of hops, short distance, large number of unused channels, or low cost. As a result, the selected route is sometimes the drop-and-continue system and the dual transmit system. For example, in this case, the number of hops between the start node 11 and the secondary node 13 is three and the number of hops between the primary node and the secondary node is one, so the primary node to secondary node is used as the spare route. That is, the drop-and-continue system is selected and the node 12 becomes the branch node. It is also possible to replace these calculated values with a predetermined policy to select one of the drop-and-continue system and dual transmit system.

EXAMPLE 6

In Example 5, when the working path passes through both the primary node and secondary node of the home ring, the drop-and-continue system is selected.

EXAMPLE 7

Further, in Example 5, the spare path route calculation unit 7 calculates the shortest route using as candidates the nodes included in the route of the working path in the connection nodes of the destination ring and the drop node or terminating node of the destination ring. Specifically, when setting the working path passing through the nodes 11-12-22-21-02 in the network shown in FIG. 2, the shortest route is calculated using as candidates for the route of the spare path the connection nodes 22 and 23 of the destination ring 2 of the ring 1 and the drop node of the destination ring 2, that is, the node 21, and the shortest route is determined as the spare path. When the branch node is the node 12, the route 12-13-23-22 is the shortest and is determined as the spare path.

EXAMPLE 8

In Example 4, the rings 1 to 3 were bi-directional line switched rings (BLSR). The spare path route calculation unit 7 selects one of the drop-and-continue system and dual transmit system based on a policy or the results of comparison of at least one of the number of hops, distance, number of unused channels, and cost between the drop node or terminating node of the destination ring and a secondary node constituted by a node not on the route of the working path or a node far from the terminating node on the route of the working path among the nodes present in the destination ring and connected to nodes of the home ring and forming pairs with them and between a primary node constituted by a node not the secondary node among the nodes present in the destination ring, connected to the nodes of the home ring, and forming pairs with them and a secondary node.

Specifically, assume that the rings 1 to 3 forming part of the network of FIG. 2 are BLSR rings and a working path passing through 11-12-22-21-02 is set. Therefore, the spare path route calculation unit 7 calculates at least one of the number of hops, distance, number of unused channels, and cost between the drop node 21 of the destination ring 2 of the ring 1 and the secondary node 23 constituted by a node not on the route of the working path in the pair of nodes 22 and 23 present in the destination ring 2 and connected to the nodes 12 and 13 of the home ring 1. Further, it selects at least one of the number of hops, distance, number of unused channels, and cost between the primary node 22 constituted by the node not the secondary node 23 among the nodes present in the destination ring 2 and connected to nodes of the home ring 1 and the secondary node 23. It compares the calculated values and selects the route with a small number of hops, short distance, large number of unused channels, or low cost. As a result, the selected route is sometimes the drop-and-continue system and the dual transmit system. For example, in this case, the number of hops between the drop node 21 and the secondary node 23 is three and the number of hops between the primary node and the secondary node is one, so the primary node 22 to secondary node 23 is used as the spare route. That is, the drop-and-continue system is selected at the ring 2. When the branch node is the node 12, the route of the spare path becomes 12-13-23-22. It is also possible to replace these calculated values with a predetermined policy to select one of the drop-and-continue system and dual transmit system for each ring.

EXAMPLE 9

In Example 9, the rings are bi-directional line switched rings (BLSR). When the branch node judgment unit 6 judges that for example the node 12 is the branch node, the data arriving at the node 12 is transferred to the node adjoining the home node by one of the drop-and-continue system and dual transmit system in accordance with the content of the inter-node connection information table 10.

EXAMPLE 10

FIG. 6 is a view of an example of a branch node judgment table employed in Example 10. In the figure, 60 is a branch node judgment table determining whether the node A is a branch node, while 61 is a branch node judgment table determining whether the node B is a branch node. As shown in the branch node judgment table 60, for the node A, when the ADD node is A and the drop node is B, the node A is not the branch node, while when the ADD node is A and the drop node is C, the node A is the branch node. Further, as shown by the branch node judgment table 61, for the node B, when the ADD node is A and the drop node is B, the node B is not the branch node, while when the ADD node is D and the drop node is B, the node B is the branch node. The inter-node connection information table 10 is provided with branch node judgment tables 60 and 61 such as shown in FIG. 6 storing in advance whether the home node is branched or not for the combination of nodes which the working path adds and drops in the rings to which the nodes belong. The branch node judgment unit 6 selects one of the drop-and-continue system and dual transmit system in accordance with the branch node judgment tables 60 and 61.

EXAMPLE 11

In this example, in Example 7, the spare path route calculation unit 7 is designed to select the route passing through the connection rings through which the working path does not pass as the spare path.

EXAMPLE 12

In this example, there is provided a signaling system in a network setting a path passing through two BLSR rings connected by a plurality of nodes by signaling, wherein the ADD node of the first ring adds the inter-ring connection system information showing the system connecting the rings to the signaling message.

EXAMPLE 13

In this example, in Example 12, as the inter-ring connection system information, a flag showing the dual transmit system or drop-and-continue system is added to the signaling message.

EXAMPLE 14

In this example, in Example 12, as the inter-ring connection system information, node information forming the branch node is added to the signaling message.

EXAMPLE 15

In this example, in Example 3, a spare path route calculation unit for calculating the route from the branch node to the spare path terminating node is further provided. At the ADD or start node of the first ring receiving the signaling message for setting the working path, the route of the branch node and spare path is calculated and route information of the spare path is added to the signaling message.

The embodiments explained above will be explained in further detail by FIGS. 7A to 7D to FIG. 12. FIGS. 7A to 7D are views for explaining in brief the signaling operation at the network in different embodiments. In the examples shown in FIG. 7A to FIG. 7D, the ingress node is the start node of the path, the ring 1 has nodes A, B, and C, the node 2 has the nodes D, E, and F, and the egress is the end point of the path. From the ingress node, path message including route information of the working path (ERO (explicit route object)) is sent. Each node in the ring receiving the path message processes the message and transfers it on. The node judged to be the branch node starts the signaling of the spare path.

In the case of FIG. 7A, at the node B on the working path from the ingress passing through the ADD node A of the ring 1, by the drop-and-continue system, the working path is dropped at the node D of the ring 2, while the spare path is continued at the node C of the ring 1. The spare path extends from the node C through the node E of the ring 2 to the node D. At the ring 2, the working path and the spare path are joined by the drop-and-continue system at the node D and reach the egress through the node F. In the case of FIG. 7A in this way, only the drop-and-continue system is utilized for forming the spare path. This system is disclosed by the prior application of this application, that is, Japanese Patent Application No. 2005-102092. In this case, as explained above, there was the problem that the efficiency of utilization of the spare path network resources is poor depending on the network configuration or route of the working path. For example, when there are a large number of nodes between the node B and the node C on the route of the spare path, with the drop-and-continue system of FIG. 7A, these nodes have to be used and therefore the resources end up becoming wastefully used.

FIG. 7B is an example of use of the dual transmit system in the ring 1 and use of the drop-and-continue system in the ring 2. That is, the working path from the ingress to the ADD node A is determined so as to form a spare path by the dual transmit system at the ring 1 and the drop-and-continue system at the ring 2 by the branch node judgment unit 6 and spare path route calculation unit 7. In this way, the working path passes through the nodes A, B, D, and F and reaches the egress, while the spare path passes through the nodes A, C, E, and D.

FIG. 7C is an example of use of the drop-and-continue system in the ring 1 and use of the dual transmit system in ring 2. That is, the working path from the ingress to the ADD node A is determined so as to form a spare path by the drop-and-continue system at the ring 1 and the dual transmit system at the ring 2 by the branch node judgment unit 6 and spare path route calculation unit 7. In this way, the working path passes through the nodes A, B, D, and F and reaches the egress, while the spare path passes through the nodes B, C, E, and F.

FIG. 7D is an example of use of the dual transmit system for both of the ring 1 and ring 2. That is, the working path from the ingress to the ADD node A is determined so as to form the spare path by the dual transmit system at the ring 1 and the dual transmit system at the ring 2 by the branch node judgment unit 6 and the spare path route calculation unit 7. The working path passes through the nodes A, B, D, and F to the egress, while the spare path passes through the nodes A, C, E, and F.

In this way, according to the examples of the present invention, it is determined whether to form the spare path by the drop-and-continue system or the dual transmit system, so a signaling system is provided which improves the efficiency of utilization of the network resources and enables the correct spare route to be autonomously set.

Figure 8:
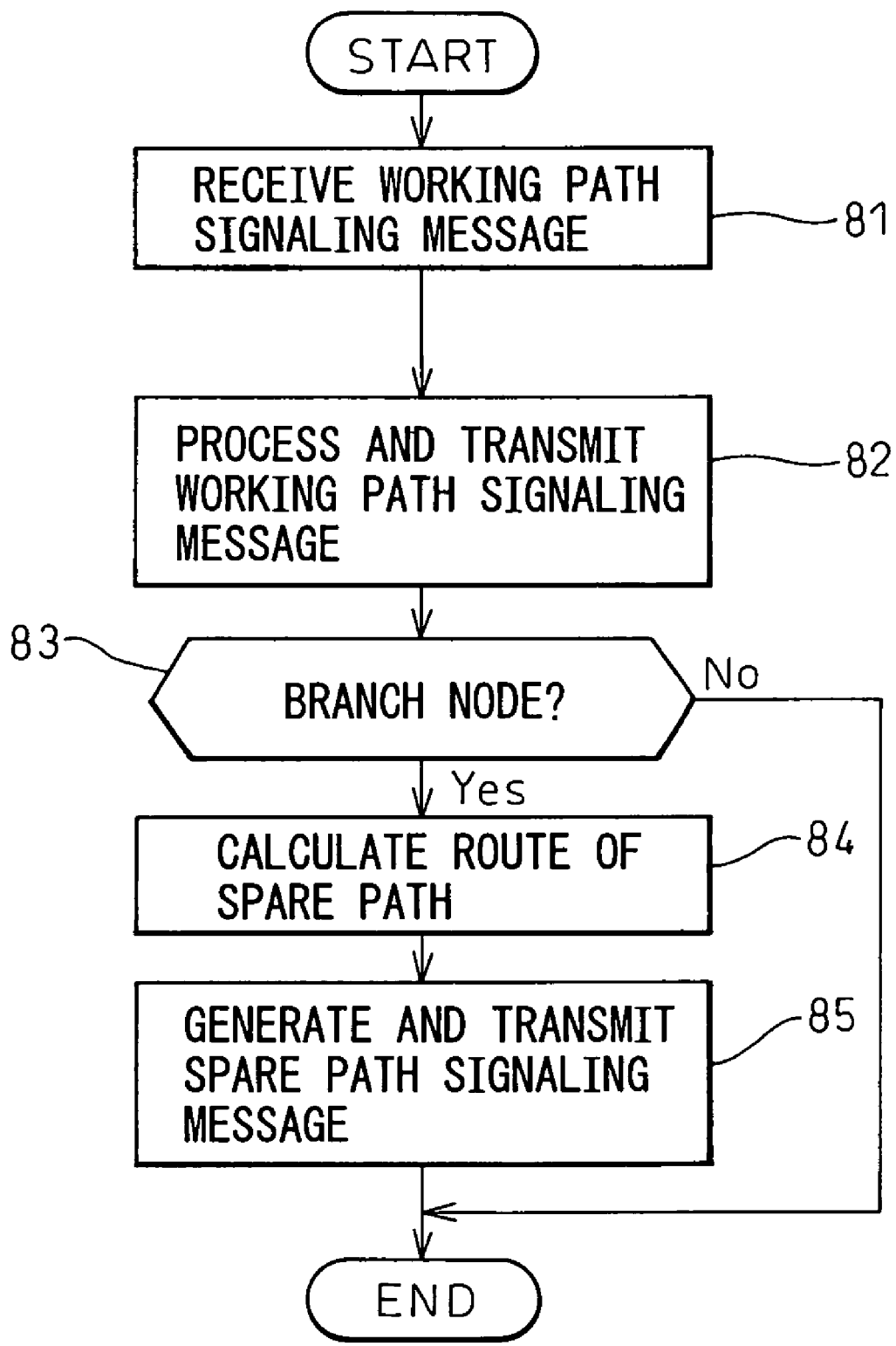
FIG. 8 is a flow chart of an example of the operation in processing at a node shown in FIG. 1.

FIG. 8 is a flow chart of an example of the operation of the processing at the node shown in FIG. 1. In the figure, at step 81, the message processing unit 5 receives the working path signaling message. Next, at step 82, it processes the signaling message for the working path and transmits the message to the next node. At this time, the home node information is added to the message as information of the route passed through. For example, with the RSVP-TE, the information is added to the RRO (record route object). Further, the working path message is transferred to the branch node judgment unit 6.

Next, at step 83, the branch node judgment unit 6 uses the working path message information, home ring configuration information table 2, inter-ring connection information table 3, and adjoining ring configuration information table 4 to judge if the home node becomes the branch node. If becoming the branch node, the spare path route calculation unit 7 receives the working path message information. The spare path route calculation unit 7 uses the working path message information, home ring configuration information table 2, inter-ring connection information table 3, and adjoining ring configuration information table 4 to calculate the route of the spare path and transfers to the message processing unit 5 the working path message information and spare path route information. The message processing unit 5 generates the spare path signaling message and transmits the message to the next node.

FIG. 9 is a flow chart explaining an example of the operation at the branch node judgment unit 6. In the figure, first, at step 91, it is judged if the node is the initial ADD node. The branch node may be the initial ADD node (node A of FIG. 6) or the primary drop node (node B of FIG. 6).

Whether a node is the initial ADD node can be determined by learning for example that the node is the ADD node by for example the ERO (explicit route object)/RRO (record route object) of the working path and the information in the home ring configuration information table 2 and by the fact that it does not doubly belong from the ERO/RRO of the working path and information in the inter-ring connection information table 3.

When it is judged at step 91 that the node is the initial ADD node, the routine proceeds to step 92, where the branch node judgment unit 6 judges if the working path passes through both of the primary node and secondary node from for example the ERO of the working path, the home ring configuration information table 2, and the inter-ring connection information table 3. When the working path passes through both the primary node and secondary node, it is judged at step 93 that the initial ADD node does not become the branch node.

When it is judged at step 92 that the working path does not pass through both the primary node and secondary node, the routine proceeds to step 94, where the branch node judgment unit 6 compares the cost between the ADD node and secondary node and the cost between the primary node and secondary node. If the cost between the ADD node and secondary node is not large, it is judged at step 95 that the ADD node is a branch node. In this case, the cost may also be the number of hops, the distance, the number of unused channels, etc. between nodes. These values are stored in the cost information table 8 shown in FIG. 1. Further, a policy may be followed when it is determined for example to use the drop-and-continue system for the ring.

When the judgment at step 91 is that the node is not the initial ADD node, the routine proceeds to step 96, where it is judged if the node is the primary drop node. Whether it is the primary drop node can be determined by learning that the node is a drop node by for example the ERO/RRO of the working path and the information in the home ring configuration information table 2 and by the fact that a node forming part of a pair of inter-link connection nodes is not included in the working path RRO.

When it is judged at step 96 that the node is a primary drop node, the routine proceeds to step 97, where it is judged if the working route includes a secondary node. If not including it, at step 98, a comparison operation is performed the same as in step 94.

When the judgment at step 97 is that the working route includes a secondary node and the judgment at step 98 is that the cost between the ADD node and secondary node is larger than the cost between the primary node and secondary node, it is judged at step 95 that the node is a branch node. Whether the working route includes a secondary node can be judged by whether the ERO of the working path includes a node becoming part of a pair of the inter-ring connection nodes.

When it is judged at step 96 that the node is not the primary drop node and when it is judged at step 98 that the cost between the ADD node and secondary node is not larger than the cost between the primary node and the secondary node, it is judged at step 99 that the node is not a branch node.

For example, when the ERO of the working path includes a node forming a pair, the primary drop node becomes the branch node. If not, the cost between the ADD node and secondary node and the cost between the primary node and secondary node are compared. If the cost between the ADD node and secondary node is larger, the primary drop node becomes the branch node.

When the branch node judgment unit 6 judges the node is the branch node, the spare path route calculation unit 7 receives the working path message information. The spare path route calculation unit 7 calculates the route of the spare path in the following way. First, the candidates of the node forming the end point of the spare path become the nodes through which the working path passes among the primary node and secondary node of the next ring and the nodes where the working path is dropped or terminated at in the next ring.

FIGS. 10A and 10B are views of examples of the configuration of the ring. For example, in FIG. 10A, the nodes D and F become the candidates of the node forming the end point of the spare path. In FIG. 10B, the nodes E and F become the candidates of the node forming the end point of the spare path. The spare path route calculation unit 7 uses the message information of the working path, the home ring configuration information table 2, the inter-ring connection information table 3, and the adjoining ring configuration information table 4 to select the nodes forming the candidates of the node becoming the end point of the spare path. In the case of Example 2, when the working path is terminated at the ring, even without the adjoining ring configuration information table 4, the terminating node candidates of the spare path can be determined. Further, the shortest routes of the working path and link disjoints from the home node to the individual candidate nodes are calculated and the shortest among them becomes the spare route. The message processing unit 5 receiving this spare route information generates the signaling message of the spare path and transmits the message to the next node.

FIG. 11 is a flow chart for explaining one operation of the node according to Example 13. In the figure, at step 1100, the message processing unit 5 of the node 1 receives a working path signaling message. Next, the branch node judgment unit 6 performs the operation from step 1101 to 1104. That is, at step 1101, it judges if the node is the first ADD node. If not, at step 1102, it judges if the home node is the primary drop node and the flag added to the message indicates the drop-and-continue system. Further, when the judgment at step 1101 is that the node is the first ADD node, the routine proceeds to step 1103, where the branch node is calculated. At step 1104, it is judged if the home node is a branch node.

If the judgment at step 1102 is yes, the spare path route calculation unit 7 calculates the route of the spare path at step 1105 and the message processing unit 5 processes and transmits the working path signaling message at step 1106. Next, the message processing unit 5 generates and transmits a spare path signaling message at step 1107.

If the judgment at step 1102 is negative, the message processing unit 5 processes and transmits the working path signaling message at step 1108.

When judging that the home node is the branch node in the judgment at step 1104, the routine proceeds to step 1109, where the spare path route calculation unit 7 calculates the route of the spare path. At step 1110, the message processing unit 5 processes and transmits the working path signaling message. Next, at step 1111, the message processing unit 5 generates and transmits the spare path signaling message.

If the judgment at step 1104 is negative, the flag showing the connection system information is added at step 1112, then the message processing unit 5 generates and transmits the spare path signaling message at step 1113.

Figure 12:
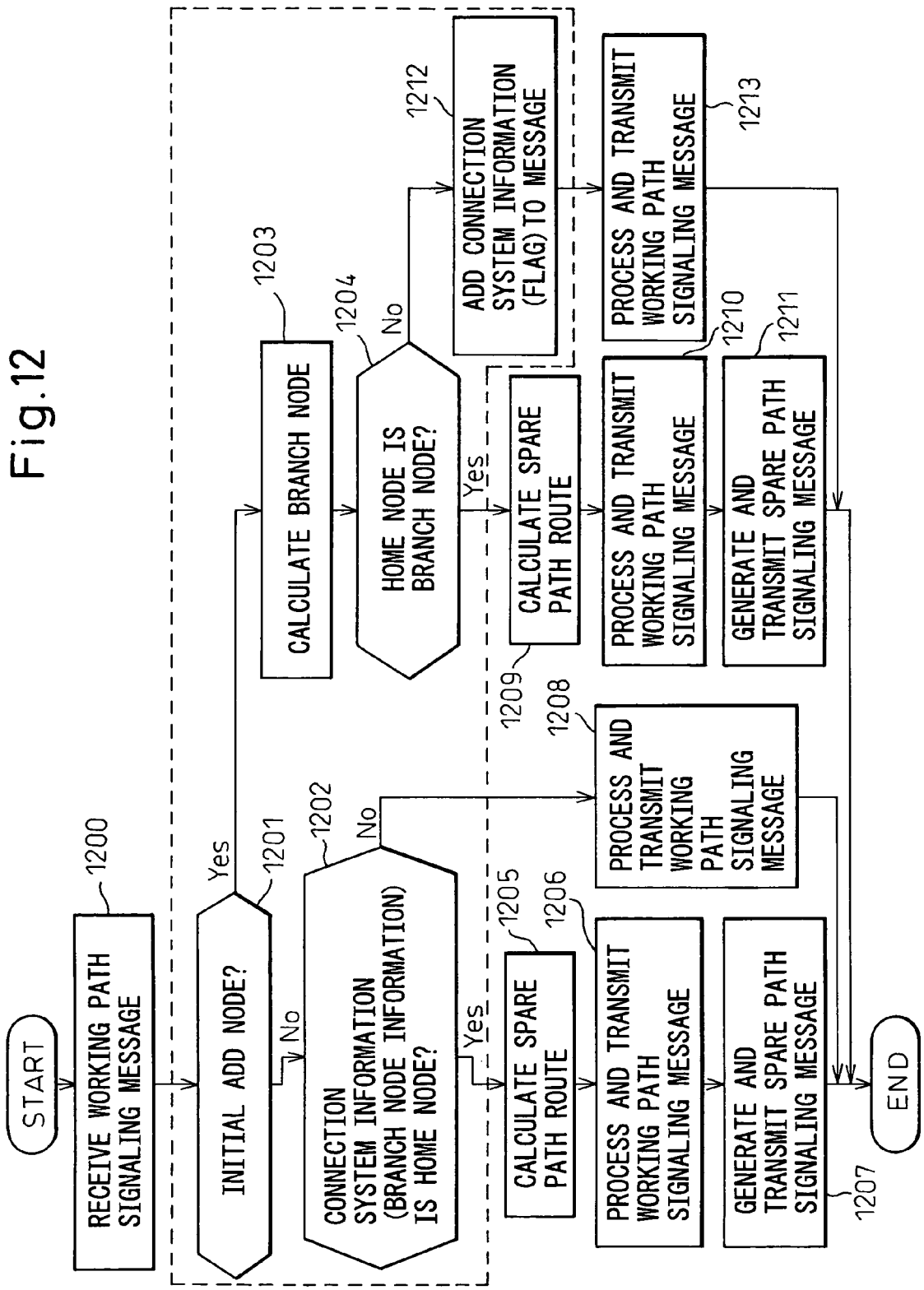
FIG. 12 is a flow chart for explaining one operation of a node according to Example 14.

FIG. 12 is a flow chart for explaining one operation of the node according to Example 14. In FIG. 12, the difference from FIG. 11 is that instead of the judgment at step 1102 at FIG. 11, at FIG. 12, it is judged at step 1202 if the connection system information (branch node information) indicates the home node and that instead of step 1112 of FIG. 11 and that at FIG. 12, the message connection system information (branch node information) is added to the message at step 1212. The rest of the operation is the same as FIG. 11, so the explanation is omitted here.

As clear from the above explanation, according to the present invention, it is possible to set a spare path with a good efficiency of utilization of resources by suitably selecting the drop-and-continue system and dual transmit system.

While the invention has been described with reference to specific embodiments chosen for purpose of illustration, it should be apparent that numerous modifications could be made thereto by those skilled in the art without departing from the basic concept and scope of the invention.

The invention claimed is:

1. A signaling system setting a path passing through two rings interconnected by a plurality of nodes forming a network by signaling, wherein each of said nodes is provided with an inter-node connection information table including topology information indicating how the nodes in the network are connected and a branch node judgment unit judging whether that home node becomes a branch node based on content of said inter-node connection information table, and when that home node receives a signaling message for setting a working path and said branch node judgment unit judges that that node is a branch node, the spare path signaling is started for the destination node of the spare path based on the information in the inter-node connection information table so as to autonomously set a spare path, wherein the path passing through said two rings is a path terminated at a destination ring, said inter-node connection information table is provided with a home ring configuration information table including home ring topology indicating how the nodes in the home ring to which the home node belongs are connected and an inter-ring connection information table including inter-ring connection information indicating how the home ring is connected to the nodes in a ring adjoining the home ring, and said branch node judgment unit sets said spare path based on the content of said home ring configuration information table and said inter-ring connection information table.

2. The signaling system as set forth in claim 1, wherein each of said nodes is further provided with a spare path route calculation unit calculating a route from a branch node to a spare path terminating node, and when receiving the signaling message for setting a working path and said branch node judgment unit judges the node is a branch node, the spare path route calculation unit calculates a cost of the route of the spare path and starts the signaling for the most inexpensive spare path so as to autonomously set the spare path.

3. The signaling system as set forth in claim 2, wherein said rings are bi-directional line switched rings (BLSR), and the branch node judgment unit selects one of a drop-and-continue system and dual transmit system based on a policy or the results of comparison of at least one of the number of hops, distance, number of unused channels, and cost between a start node and ADD node of the home ring and a secondary node constituted by a node not on the route of the working path or a node far from the start node on the route of the working path among the nodes present in the home ring and connected to nodes of the ring adjoining the home ring and forming pairs with them and between a primary node constituted by a node not the secondary node among the nodes connected to the nodes of the ring adjoining the home ring and forming pairs with them and a secondary node.

4. The signaling system as set forth in claim 3, wherein when said working path passes through both of said primary node and second node of said home ring, said drop-and-continue system is selected.

5. The signaling system as set forth in claim 2, wherein said spare path route calculation unit determines the route of the spare path by calculating the shortest route using as candidates of the end point of the spare path the nodes included on the path of the working path in the interconnection nodes of the destination ring and drop nodes or terminating node of the destination ring.

6. The signaling system as set forth in claim 1, wherein the rings are bi-directional line switched rings (BLSR) and, when the branch node judgment unit judges that for example the node is the branch node, the data arriving at the node is transferred to the node adjoining the home node by one of the drop-and-continue system and dual transmit system in accordance with the content of the inter-node connection information table.

7. The signaling system as set forth in claim 1, wherein said inter-node connection information table is provided with branch node judgment tables setting and storing in advance whether the home node is branched or not for the combination of nodes which the working path adds and drops in the rings to which the nodes belong, and the branch node judgment unit selects one of the drop-and-continue system and dual transmit system in accordance with the branch node judgment tables.

8. The signaling system as set forth in claim 1, wherein the spare path route calculation unit selects a route passing through interconnection links through which the working path does not pass as the spare path.

9. A signaling method setting a path passing through two rings interconnected by a plurality of nodes forming a network by signaling, comprising providing each of said nodes with an inter-node connection information table including topology information indicating how the nodes in the network are connected and a branch node judgment unit judging whether that home node becomes a branch node based on content of said inter-node connection information table and when that home node receives a signaling message for setting a working path and said branch node judgment unit judges that that node is a branch node, starting the spare path signaling for the destination node of the spare path based on the information in the inter-node connection information table so as to autonomously set a spare path, wherein the path passing through said two rings is a path terminated at a destination ring, said inter-node connection information table is provided with a home ring configuration information table including home ring topology indicating how the nodes in the home ring to which the home node belongs are connected and an inter-ring connection information table including inter-ring connection information indicating how the home ring is connected to the nodes in a ring adjoining the home ring, and said branch node judgment unit sets said spare path based on the content of said home ring configuration information table and said inter-ring connection information table.

10. A signaling system setting a path passing through two rings interconnected by a plurality of nodes forming a network by signaling, wherein each of said nodes is provided with an inter-node connection information table including topology information indicating how the nodes in the network are connected and a branch node judgment unit judging whether that home node becomes a branch node based on content of said inter-node connection information table, and when that home node receives a signaling message for setting a working path and said branch node judgment unit judges that that node is a branch node, the spare path signaling is started for the destination node of the spare path based on the information in the inter-node connection information table so as to autonomously set a spare path, wherein the path passing through said two rings is a path not terminated at a destination ring, said inter-node connection information table is provided with a home ring configuration information table including home ring topology indicating how the nodes in the home ring to which the home node belongs are connected, an inter-ring connection information table including inter-ring connection information indicating how the home ring is connected to the nodes in a ring adjoining the home ring, and an adjoining ring configuration information table including adjoining ring topology information indicating how the nodes in the ring adjoining the home ring are connected, and said branch node judgment unit sets said spare path based on the content of said home ring configuration information table, said inter-ring connection information table, and said adjoining ring configuration information table.

11. The signaling system as set forth in claim 10, wherein the system is further provided with a spare path route calculation unit for calculating a route from a branch node to a spare path terminating node and an ADD or start node of an initial ring receiving a signaling message for setting a working path calculates the branch node and route of the spare path and adds the route information of the spare path to the signaling message.

12. A signaling system setting a path passing through two rings interconnected by a plurality of nodes forming a network by signaling, wherein each of said nodes is provided with an inter-node connection information table including topology information indicating how the nodes in the network are connected and a branch node judgment unit judging whether that home node becomes a branch node based on content of said inter-layer connection information table, and when that home node receives a signaling message for setting a working path and said branch node judgment unit judges that that node is a branch node, the spare path signaling is started for the destination node of the spare path based on the information in the inter-node connection information table so as to autonomously set a spare path, wherein each of said nodes is further provided with a spare path route calculation unit calculating a route from a branch node to a spare path terminating node, and when receiving the signaling message for setting a working path and said branch node judgment unit judges the node is a branch node, the spare path route calculation unit calculates a cost of the route of the spare path and starts the signaling for the most inexpensive spare path so as to autonomously set the spare path and, wherein said rings are bi-directional line switched rings (BLSR), and the branch node judgment unit selects one of a drop-and-continue system and dual transmit system based on a policy or the results of comparison of at least one of the number of hops, distance, number of unused channels, and cost between a start node or ADD node of the home ring and a secondary node constituted by a node not on the route of the working path or a node far from the start node on the route of the working path among the nodes present in the home ring and connected to nodes of the ring adjoining the home ring and forming pairs with them and between a primary node constituted by a node not the secondary node among the nodes connected to the nodes of the ring adjoining the home ring and forming pairs with them and a secondary node.

13. A signaling system setting a path passing through two rings interconnected by a plurality of nodes forming a network by signaling, wherein each of said nodes is provided with an inter-node connection information table including topology information indicating how the nodes in the network are connected and a branch node judgment unit judging whether that home node becomes a branch node based on content of said inter-layer connection information table, and when that home node receives a signaling message for setting a working path and said branch node judgment unit judges that that node is a branch node, the spare path signaling is started for the destination node of the spare path based on the information in the inter-node connection information table so as to autonomously set a spare path, wherein each of said nodes is further provided with a spare path route calculation unit calculating a route from a branch node to a spare path terminating node, and when receiving the signaling message for setting a working path and said branch node judgment unit judges the node is a branch node, the spare path route calculation unit calculates a cost of the route of the spare path and starts the signaling for the most inexpensive spare path so as to autonomously set the spare path and, wherein said rings are bi-directional line switched rings (BLSR), and the branch node judgment unit selects one of a drop-and-continue system and dual transmit system based on a policy or the results of comparison of at least one of the number of hops, distance, number of unused channels, and cost between a drop node or terminating node of the destination ring and a secondary node constituted by a node not on the route of the working path or a node far from the terminating node on the route of the working path among the nodes present in the destination ring and connected to nodes of the home ring and forming pairs with them and between a primary node constituted by a node not the secondary node among the nodes present in the destination ring, connected to the nodes of the home ring, and forming pairs with them and a secondary node.

* * * * *